United States Patent
Norman et al.

(10) Patent No.: US 7,617,685 B2
(45) Date of Patent: Nov. 17, 2009

(54) QUICK CHANGE FASTENER SYSTEM FOR ATTACHING LINER BRACKET TO CONVERGENT FLAP AND SEAL IN TURBINE NOZZLE

(75) Inventors: Richard F. Norman, West Warren, MA (US); Kyle J. Osga, Windham, CT (US)

(73) Assignee: United Technologies Corporation, Hartford, CT (US)

( * ) Notice: Subject to any disclaimer, the term of this patent is extended or adjusted under 35 U.S.C. 154(b) by 299 days.

(21) Appl. No.: 11/529,836

(22) Filed: Sep. 29, 2006

(65) Prior Publication Data

US 2008/0078161 A1    Apr. 3, 2008

(51) Int. Cl.
   *F02K 1/00*    (2006.01)
(52) U.S. Cl. .................. 60/770; 60/771; 239/265.39
(58) Field of Classification Search .............. 60/770, 60/771; 239/265.39, 265.41
   See application file for complete search history.

(56) References Cited

U.S. PATENT DOCUMENTS

| 3,972,475 | A | * | 8/1976 | Nelson et al. ............. 239/127.3 |
| 5,239,815 | A | * | 8/1993 | Barcza ........................ 60/228 |
| 5,676,312 | A | * | 10/1997 | Lapergue et al. ....... 239/265.19 |
| 5,775,589 | A | * | 7/1998 | Vdoviak et al. .......... 239/127.1 |
| 6,964,169 | B2 | * | 11/2005 | Pancou et al. .................. 60/771 |

OTHER PUBLICATIONS

Drawing of Prior Art Gas Turbine Engine Augmentor Liner Locking Feature.

* cited by examiner

*Primary Examiner*—Michael Cuff
*Assistant Examiner*—Phutthiwat Wongwian
(74) *Attorney, Agent, or Firm*—Carlson, Gaskey & Olds

(57) ABSTRACT

A quick change connection is provided for attaching a bracket and liner subassembly to convergent flaps and seals in an adjustable nozzle for a gas turbine engine. A threaded attachment member has a t-shaped head that is secured to prevent rotation by a washer. The washer is held in place in the convergent flaps and seals by spring fingers in a slot. By utilizing the washer, a simple threaded connection can be utilized even though the threaded attachment member must extend to a radially outer surface of the convergent flaps and seals, while a nut is threaded onto the threaded attachment member radially inwardly of the convergent flaps and seals. The washer prevents rotation of a head of the threaded attachment member, and thus allows the nut to be easily tightened to secure the components. This also facilitates maintenance as the threaded nut can be easily removed from the threaded attachment for replacement.

11 Claims, 4 Drawing Sheets

QUICK CHANGE FASTENER SYSTEM FOR ATTACHING LINER BRACKET TO CONVERGENT FLAP AND SEAL IN TURBINE NOZZLE

BACKGROUND OF THE INVENTION

This application relates to a bolt and washer combination that facilitates the attachment of a bracket and liner to a convergent flap and seal in a nozzle of a gas turbine engine.

A gas turbine engine typically includes a plurality of sections, which are positioned in series. A fan section moves air downstream towards a compressor section. The compressor section compresses the air and delivers it into a combustion section. In the combustion section, air and fuel are mixed and combusted. Products of combustion pass downstream over turbines, and then outwardly through a nozzle.

It is known in the prior art to vary the cross-sectional area of the nozzle by having flaps that pivot inwardly and outwardly. Typically, a plurality of circumferentially spaced flaps and seals are positioned upstream of a throat, and are called the convergent flaps and seals. Downstream of the throat are divergent flaps and seals. The convergent flaps and seals not only move to define the throat area, but they also provide a block to prevent the products of combustion from reaching a housing outboard of the flaps and seals.

In the structure for the convergent flaps and seals, a liner typically faces the products of combustion. The liner is connected by a bracket to the flap or seal. Traditionally, the bracket has been welded to the hot liner. The bracket is then bolted to the cooler flap or seal.

In the prior art, bolting the bracket to the flaps and seals has proven to be cumbersome to initially install, and has also made replacement somewhat difficult.

The threaded attachments often were secured with sheet metal tabs, or rivets. In addition, there are challenges to utilizing the threaded fasteners, in that the flaps and seals are positioned around the entire circumference of a jet engine, and it is difficult to reach the outside of those structures, and the inside, simultaneously to tighten a nut on the threaded fastener.

This is part of the reason that the bolts needed to be staked permanently. One side of the bolt or nut must be radially outwardly of the flaps and seals, while the other must be inwardly. These are relatively large components, and it is difficult to reach both sides.

In addition, it has been proposed in the prior art to have various openings, slots, etc. to facilitate the attachment of the threaded fastener. However, all of these structures have provided a potential leakage path for products of combustion to leak, which is undesirable.

SUMMARY OF THE INVENTION

In a disclosed embodiment of this invention, a threaded bolt is utilized with a simple nut to secure the liner to the convergent flaps and seals. In features of this invention, the bolt is a t-bolt which may be inserted through a slot in the flap and seal, and then turned 90°. At this point, the t-head on the bolt will rest against the outer side of the flap and seal. A washer, which has legs extending forwardly, may then be inserted through the slot. The slot is preferably formed with spring fingers to hold the washer during installation. The bolt may then be brought with its head received between the legs on the washer, such that the legs prevent rotation of the bolt. The nut may then be tightened, securing the bracket and liner to the flap and seal. Since the spring fingers hold the washer, the washer can sit in the slot without falling, in locations where gravity would otherwise pull the washer downwardly.

To tighten and finally assemble the liner and bracket to the flaps and seals, one must merely position the parts from within the nozzle, and then can simply turn the nut onto the bolt. There is no need to reach outwardly of the flaps and seals.

These and other features of the present invention can be best understood from the following specification and drawings, the following of which is a brief description.

DETAILED DESCRIPTION OF THE PREFERRED EMBODIMENT

Figure 1:
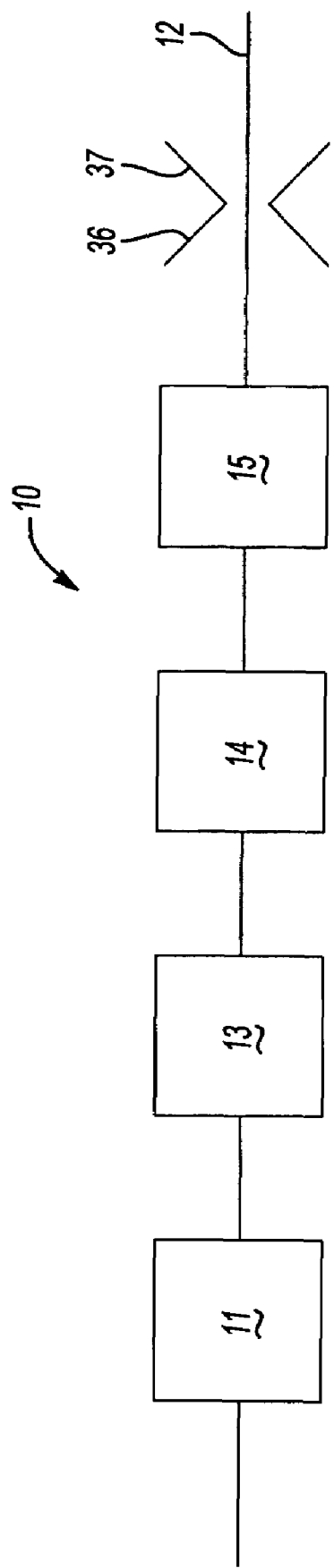
FIG. 1 is a cross-sectional view of a jet engine as known in the prior art.

FIG. 1 shows a gas turbine engine 10. As known, a fan section 11 moves air and rotates about an axial center line 12. A compressor section 13, a combustion section 14, and a turbine section 15 are also centered on the axial center line 12. A nozzle section of the turbine discharges gas downstream. A convergent section 36 leads into a throat and a divergent section 31 leads away. FIG. 1 is a schematic view, however, it does show the main components of the gas turbine engine. Further, while a particular type of gas turbine engine is illustrated in this figure, it should be understood that the present invention extends to other types of gas turbine engines.

Figure 2:
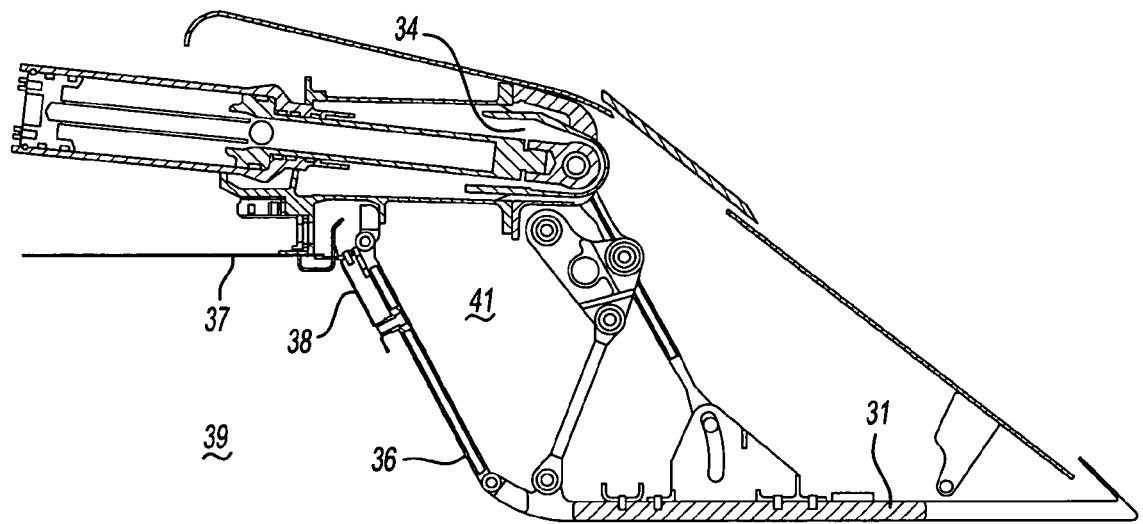
FIG. 2 shows a portion of a structure for adjusting the cross-sectional area of a nozzle.

FIG. 2 shows a prior art structure to change a cross-sectional area of the nozzle. As known, an actuator 34 drives a piston to cause the divergent section 31 and the convergent section 36 to pivot to change the cross-sectional area of the throat between the two. This structure is shown schematically, and may be as known in the art.

As shown at 36, convergent flaps and seals extend from a pivotal connection to the divergent section 31, and upwardly to a housing 37. This structure prevents hot gasses from an area 39 inward of the convergent section 36 from reaching a housing 41 housing the linkages and actuator 34. As known, a liner 38 faces the hot gas, and provides some thermal protection for the relatively cool flap and seals.

Figure 3:
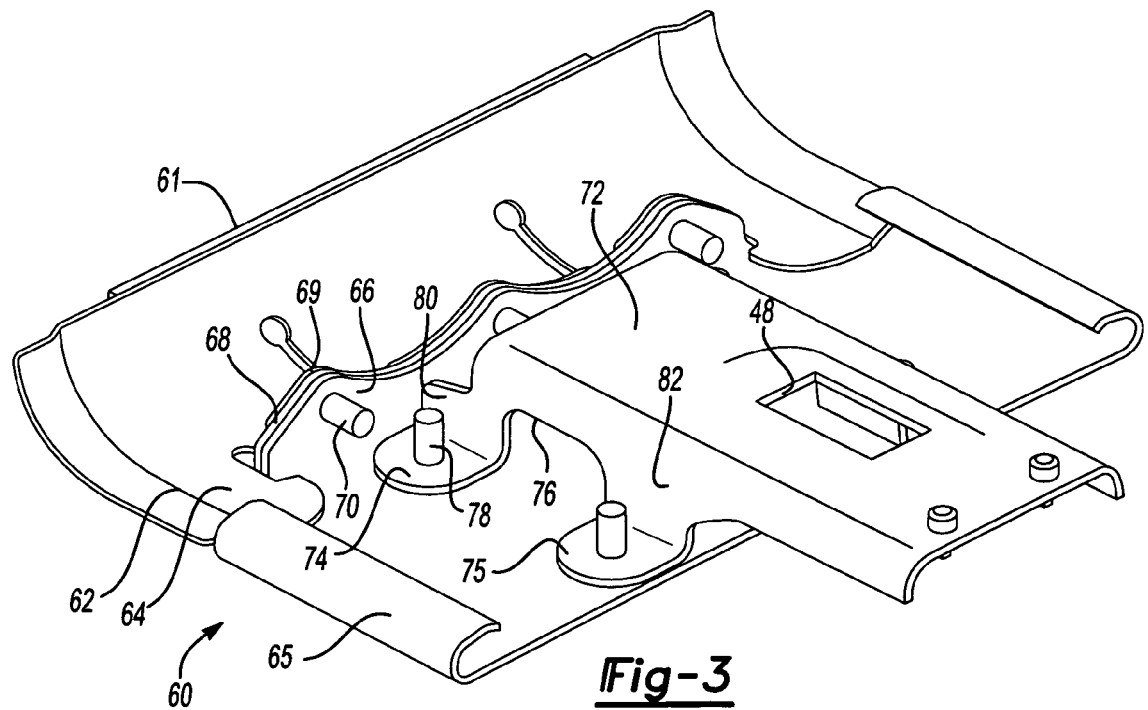
FIG. 3 shows an improved liner attachment.

As shown in FIG. 3, an inventive liner and bracket assembly 60 includes a pair of rear plates 61 and 62. A leg 64 on the rear plate 62 extends forwardly. Another plate 65 has a rear face 66 abutting rear faces 68 and 69 from the plates 61 and 62. As shown, a rivet 70 connects the three plates. Features with regard to this structure can be best understood from co-pending patent application entitled "Axially Split Nozzle Liner for Convergent Nozzle," filed on even date herewith and assigned Ser. No. 11/540,279.

The improved bracket 72 has spaced legs 74 and 75 along with an intermediate notch 76. A second pair of legs 74 and 75 is on the opposed end of the bracket. Rivets 78 secure the bracket 72 to the plate 65. Due to the notch 76, there are axially spaced legs 74 and 75, which contact the hot plate 65, reducing the footprint or contact area compared to the prior art. Notch 76 results in an area spaced away from the hot plate 65. Features of the bracket connection to the liner are disclosed in co-pending patent application entitled "Gas Turbine Engine Nozzle Liner With Thermally Compliant Attachment Brackets," filed on even date herewith, and assigned Ser. No. 11/540,310.

An alternative rivet arrangement is disclosed in the co-pending patent application entitled "Thermally Compliant Rivet Connection for Connecting Turbine Engine Liner to Convergent Flap and Seal for Turbine Nozzle," filed on even date herewith and assigned Ser. No. 11/540,309.

Figure 4:
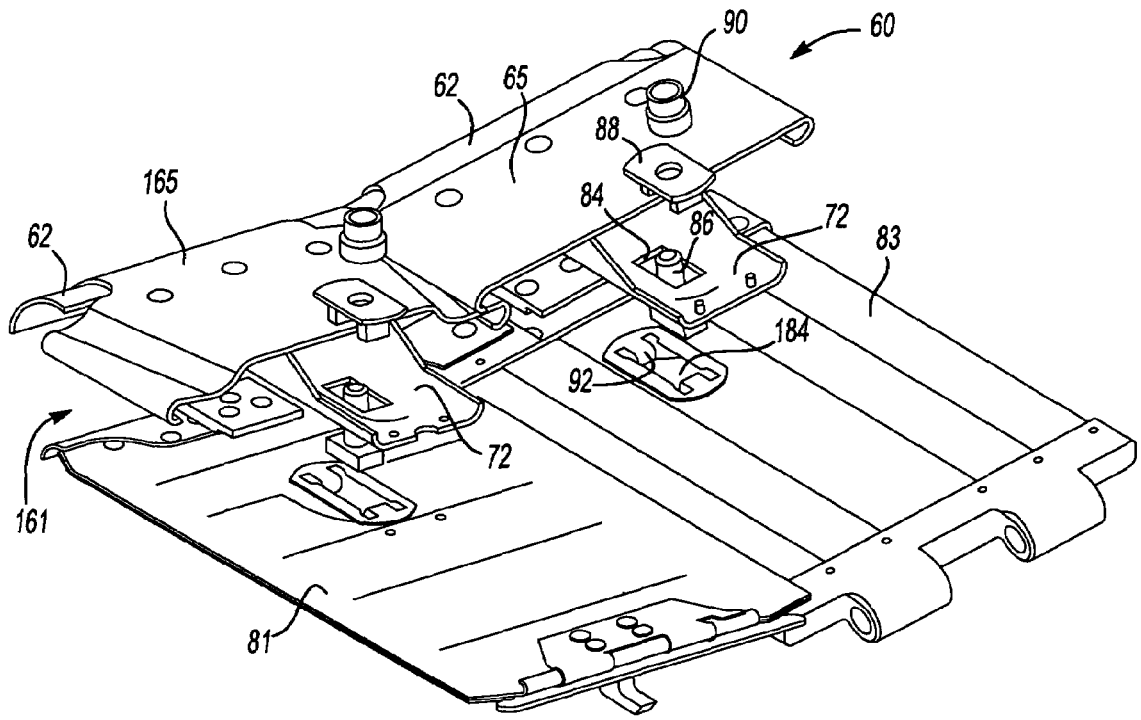
FIG. 4 is an exploded view of a convergent flap and seal along with the improved liner attachments.

As shown in FIG. 4, an assembly 60 according to the invention secures the liner and bracket 60 to an underlying convergent flap 83. As known, an opening 84 in the flap 83 receives a bolt 86 through the opening 184 in the bracket 72. A washer 88 and nut 90 secure the bolt. The opening 184 in the flap 83 has spring fingers 92 which serve to hold the washer 88 during assembly. While this finger structure is shown on elements 81 and 83 in this Figure, in one embodiment, they are positioned as shown in FIG. 7.

A similar bracket and liner arrangement 161 has backing plate 165, and is attached to a flap 81, again through an arrangement similar to that shown with regard to the seal 83.

Figure 5:
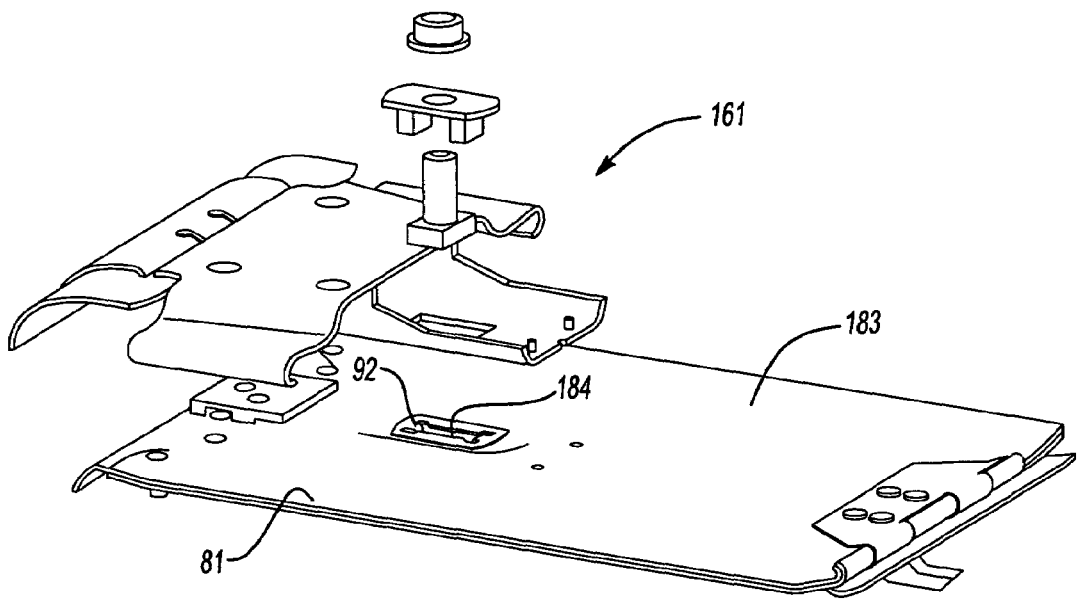
FIG. 5 is an exploded view of the seal.
Figure 6:
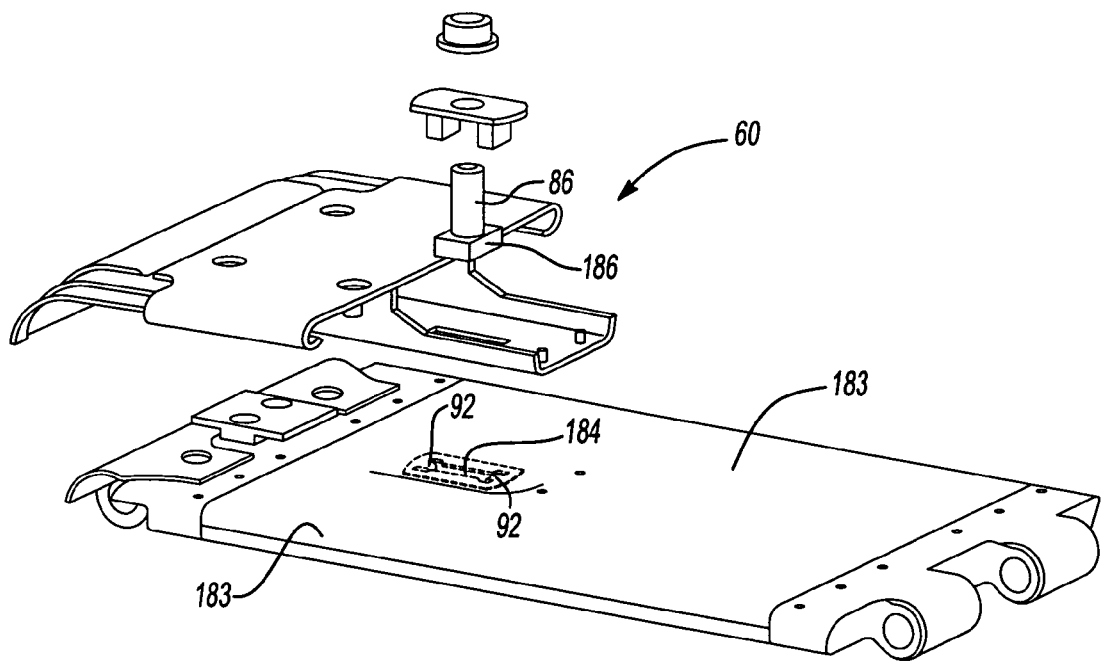
FIG. 6 is an exploded view of the flap.

FIG. 5 shows an exploded view of the components of the liner and bracket 161 and flaps 81. FIG. 6 shows a similar exploded view of the components of the bracket and liner 60 being attached to the seal 83. A cover sheet 183 is added to the FIGS. 5 and 6 flaps and seals, when compared to the exploded FIG. 4 view. While the slot 184 is shown extending through the cover sheet 183, and the fingers 92 are shown, in fact, the fingers 92 are not in the cover sheet 183. An opening would extend through the cover sheet, however, the spring fingers would be inwardly in the slot 184 formed as illustrated in FIGS. 4-7. However, they are shown in FIG. 6, such that the assembly of the various components can be more easily understood.

Figure 7:
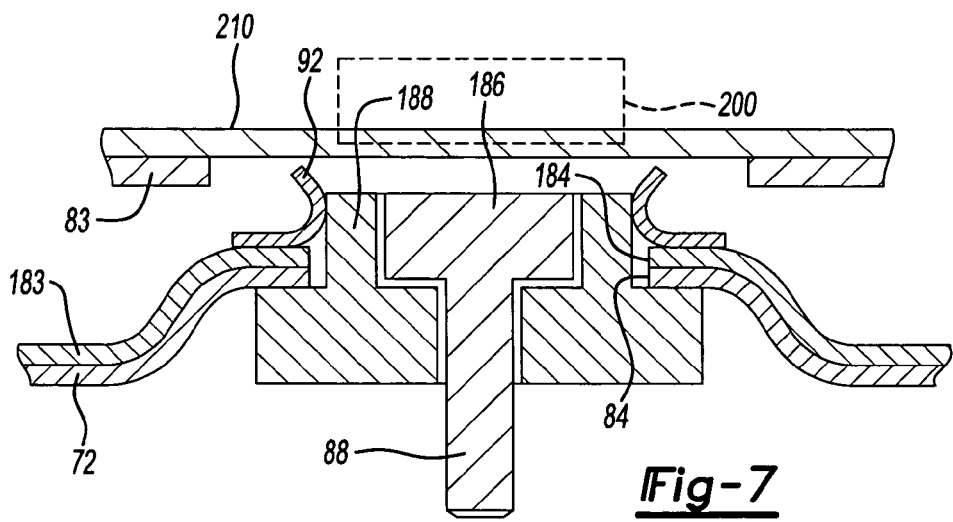
FIG. 7 is a cross-sectional view showing the assembly of the inventive components.
Figure 8:
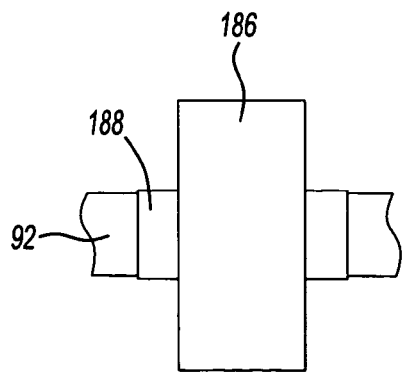
FIG. 8 shows another view.

As shown in FIG. 7, when assembling the liner and bracket assembly to the flap or seal, the bolt 86 is initially moved through the slot 184. As shown, the bolt has a t-shaped head 186. When moving through the slot 184 in the cover sheet 183, a longer length of the head 186 extends parallel to the longer length of the slot 184. This is shown in phantom at 200. In this manner, the bolt can move easily through the slot. Once through the slot, the bolt is turned 90° such that it will sit against an upper surface of the slot, and will not fall back through. At this point, the liner and bracket assembly (60, 161) is positioned on the flap or seal. Then, the washer 88 is brought downwardly with its legs 188 extending through the slots 84 and 184. The bolt head can be pulled downwardly between the legs 188, and the short dimension of the head 186 fits securely between the legs 188, such that the legs prevent rotation of the bolt 86. As can be appreciated from FIGS. 5-7, spring fingers 92 extend from both sides of the slot 184. These spring fingers catch and hold the legs 188 such that the washer will not fall radially inwardly while the nut 90 is being attached to the bolt 86. In this embodiment, the spring fingers 92 are attached to the cover sheet 183. A worker need not hold the washer, as the spring fingers 92 will do so. Nut 90 may now be tightened on the bolt. The bolt is prevented from rotating by the legs 188. As can be appreciated, the washer closes off all openings such that there will not be gas leaking through the opening. The relative position of the bolt, washer, spring fingers and slot can be appreciated from FIG. 8, which is a view from radially outwardly of the arrangement looking radially inwardly.

With the present invention, the assembly is easy to perform from a single location in the jet engine. The permanent attachment as utilized in the prior art is no longer required. A simple release of the nut 90 will allow replacement of the liner and bracket assembly.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A nozzle assembly for a gas turbine engine comprising:
a plurality of divergent flaps that are movable to adjust a cross-sectional area of an outlet of a nozzle;
a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals;
said convergent flaps and seals being connected to a liner facing inwardly and toward the products of combustion, said liner being attached to said convergent flaps and seals by a bracket, the attachment of the bracket to each of the flaps and seals provided by a threaded attachment member, said threaded attachment member having a head positioned on one radial side of said convergent flaps and seals, and a threaded portion extending radially to a second side of said convergent flaps and seals, and a nut being secured on said threaded attachment member on an opposed side of said bracket from said head, and there being structure for preventing rotation of said threaded attachment member as said nut is tightened onto said threaded attachment member; and
wherein said threaded attachment member is positioned radially outwardly of said convergent flaps and seals, and said threaded portion extending radially inwardly of said threaded flaps and seals.

2. The nozzle assembly as set forth in claim 1, wherein said structure for preventing rotation of said threaded attachment member includes a washer extending through slots in both said bracket and said convergent flaps and seals, and said washer preventing rotation of said threaded attachment member.

3. The nozzle assembly as set forth in claim 2, wherein said washer has a pair of legs that extend through said slots in said bracket and said convergent flaps and seals.

4. The nozzle assembly as set forth in claim 3, wherein said slots in said bracket and said convergent flaps and seals has spring fingers that hold said legs to retain said washer within said slots.

5. The nozzle assembly as set forth in claim 3, wherein said threaded attachment member has a rectangular shaped head, with said head having an elongate dimension and a shorter dimension, said shorter dimension fitting between said legs, and said legs retaining said head to prevent rotation of said head.

6. The nozzle assembly as set forth in claim 3, wherein said washer has a portion connected to said legs, and said portion effectively closing off said slots to prevent leakage through said slots.

7. A gas turbine engine comprising:
a fan section;
a compressor section;
a combustion section;

a turbine section;

a nozzle section, said nozzle including a plurality of divergent flaps that are movable to adjust a cross-sectional area of an outlet of a nozzle; a plurality of convergent flaps and seals positioned upstream from said divergent flaps, said convergent flaps and seals being positioned to block flow of products of combustion from a location radially inwardly of said plurality of convergent flaps and seals to an internal housing radially outwardly of said convergent flaps and seals, said convergent flaps and seals being connected to a liner facing inwardly and toward products of combustion, said liner being attached to said convergent flaps and seals by a bracket, is spaced away from said liner intermediate said spaced contact areas, the attachment of the bracket to each of the flaps and seals provided by a threaded attachment member, said threaded attachment member having a head positioned radially outwardly of said convergent flaps and seals, and a threaded portion extending radially through said convergent flaps and seals, and a nut being secured on said threaded attachment member on an opposed side of said bracket from said head, and structure preventing rotation of said threaded attachment;

wherein said threaded attachment member is positioned radially outwardly of said convergent flaps and seals, and said threaded portion extending radially inwardly of said threaded flaps and seals.

8. The nozzle assembly as set forth in claim 7, wherein a washer extends through a slot in both said bracket and said flaps and seals, and said washer preventing rotation of said threaded attachment member.

9. The nozzle assembly as set forth in claim 8, wherein said washer has a pair of legs that extend through said slots in said bracket and said flaps and seals.

10. The nozzle assembly as set forth in claim 9, wherein said slot in at least one of said bracket and said convergent flaps and seals has spring fingers that hold said legs to retain said washer within said slots.

11. The nozzle assembly as set forth in claim 9, wherein said threaded attachment member has a rectangular shaped head, with said head having an elongate dimension and a shorter dimension, said shorter dimension fitting between said legs, and said legs retaining said head to prevent rotation of said head.

* * * * *